US011076449B2

United States Patent
Pogorelik et al.

(12) United States Patent
(10) Patent No.: US 11,076,449 B2
(45) Date of Patent: Jul. 27, 2021

(54) SMART APPLIANCE FOR SELF-SUSTAINING WIRELESS NETWORK

(71) Applicant: INTEL CORPORATION, Santa Clara, CA (US)

(72) Inventors: Oleg Pogorelik, Lapid (IL); Avi Priev, Petach-Tikva (IL); Tamara Gaidar, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/647,405

(22) Filed: Jul. 12, 2017

(65) Prior Publication Data

US 2019/0021136 A1 Jan. 17, 2019

(51) Int. Cl.
| | |
|---|---|
| *H04W 88/08* | (2009.01) |
| *H04W 24/02* | (2009.01) |
| *G05D 1/02* | (2020.01) |
| *H04W 84/12* | (2009.01) |
| *H04W 84/18* | (2009.01) |
| *H04W 84/04* | (2009.01) |

(52) U.S. Cl.
CPC ........ H04W 88/085 (2013.01); G05D 1/0274 (2013.01); G05D 1/0285 (2013.01); H04W 24/02 (2013.01); H04W 84/047 (2013.01); H04W 84/12 (2013.01); H04W 84/18 (2013.01)

(58) Field of Classification Search
CPC ... H04W 88/085; H04W 24/02; H04W 84/12; H04W 84/18
See application file for complete search history.

(56) References Cited

U.S. PATENT DOCUMENTS

| | | | |
|---|---|---|---|
| 10,335,949 B2* | 7/2019 | Shin | G05D 1/00 |
| 2010/0042319 A1* | 2/2010 | Wu | G01C 21/00 |
| 2013/0124031 A1* | 5/2013 | Chen | G05D 1/02 |
| 2017/0164423 A1* | 6/2017 | Ross | H04W 88/04 |

* cited by examiner

*Primary Examiner* — Ronald B Abelson
(74) *Attorney, Agent, or Firm* — Kacvinsky Daisak Bluni PLLC

(57) ABSTRACT

Disclosed herein are systems and techniques to self-sustain a wireless network. A wireless base station and a mobile wireless extender are provided. The wireless base station can provide a wireless network. Furthermore, the mobile wireless extended can navigate within an environment to extend the wireless network provided by the wireless base station.

20 Claims, 13 Drawing Sheets

*800*

```
Receive a control signal from a WBS including an
indication to extend a wireless network provided
by the WBS.
810
```
↓
```
Navigate to a location within an environment
based on the received control signal.
820
```
↓
```
Provide an extended wireless network based on the
received control signal.
830
```

*FIG. 8*

SMART APPLIANCE FOR SELF-SUSTAINING WIRELESS NETWORK

TECHNICAL FIELD

Embodiments described herein generally relate to wireless networks and specifically to a system to self-sustain a wireless network.

BACKGROUND

Wireless networks are prevalent in today's modern world. For example, wireless networks are deployed in a multitude of settings, such as residences, office buildings, and commercial centers. However, there are often locations within an environment where a wireless network is deployed signal strength is insufficient to support demand. For example, signal strength may be insufficient to support streaming services. Conventional solutions to increase signal strength are to permanently deploy additional wireless devices throughout the environment.

BRIEF DESCRIPTION OF THE DRAWINGS

FIG. 8 illustrates a second example logic flow.

DETAILED DESCRIPTION

Figure 1:
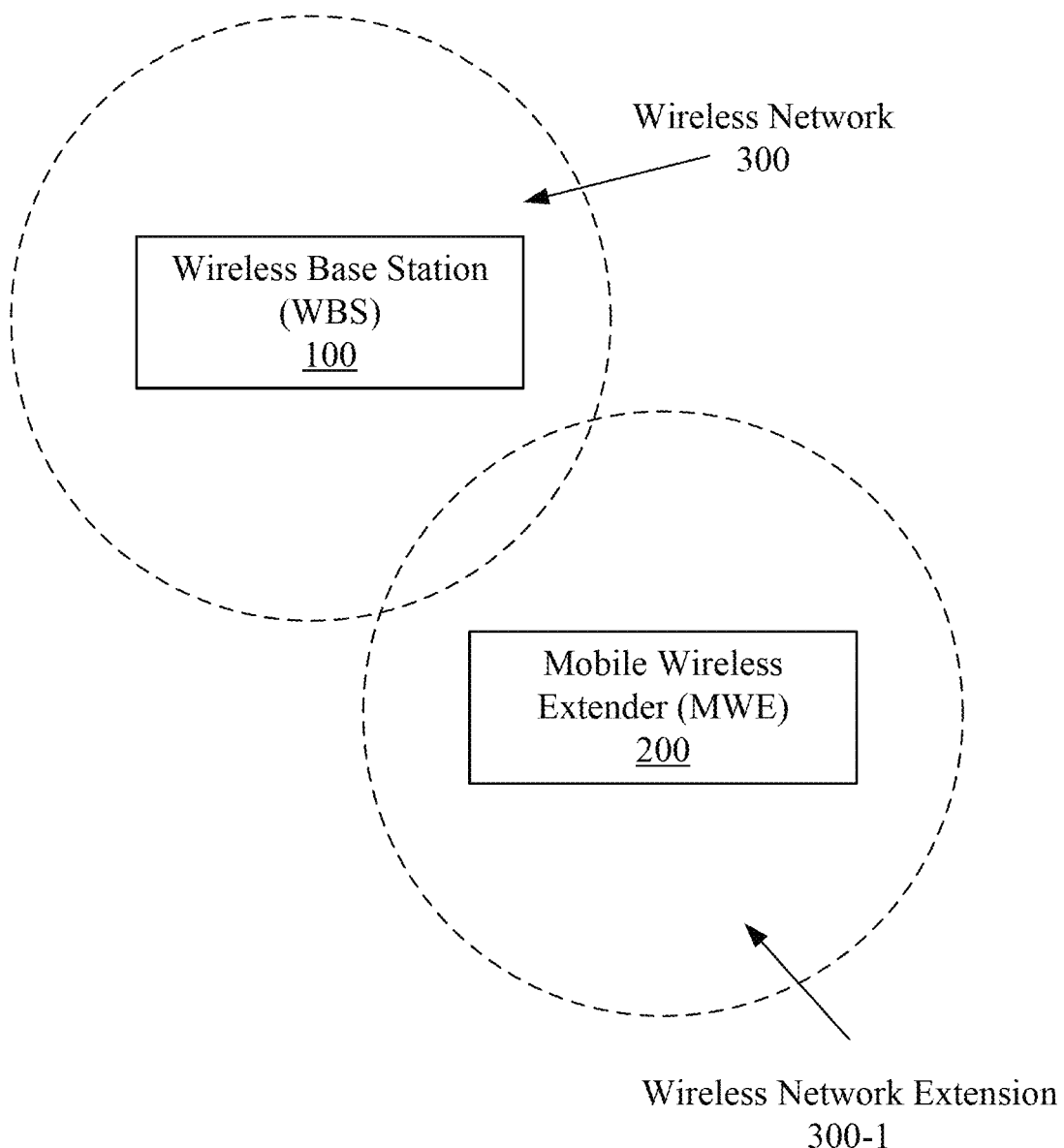
FIG. 1 illustrates an example first system.

Various embodiments provide systems, apparatuses, techniques, methods, and/or computer-readable medium to self-sustain a wireless network. For example, the present disclosure provides a system including a wireless base station (WBS) and a mobile wireless extender (MWE). The MWE can be arranged to move throughout an environment to augment wireless services provided by the WBS. In general, the MWE can move throughout an environment, for example, as requested by the WBS, to augment wireless services provided by the WBS. In some examples, the MWE can move to a location where only temporary wireless services are desired, for example, a child's room in a residence, or the like. In some examples, the MWE can move to a location where a temporary increase in wireless services, for example, to support multiple simultaneous connections, or the like, is desired. When the temporary wireless services or increase in wireless services are no longer needed, for example, as dictated by the WBS, the MWE can return to a permanent "parking" location, such as, for example, a charging station, or the like.

Accordingly, the present disclosure provides an advantage over conventional "static" wireless extenders in that a wireless network can by dynamically extended based on a temporary demand for wireless network access. The temporary demand can be moderated based on, for example, location and/or time constraints. As such, a reduction in overall radio emissions within a location (e.g., residence, or the like) can be reduced while still providing wireless coverage as needed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a system 1000 to self-sustain a wireless network. As depicted, the system 1000 can include a wireless base station (WBS) 100 and a mobile wireless extended (MWE) 200. The WBS 100 can be arranged to provide a wireless network 300 while MWE 200 can be arranged to dynamically augment or extend the wireless network 300 with extended wireless network 300-1. In general, the MWE 200 is mobile and can move, autonomously, or semi-autonomously, within an environment (e.g., residence, office space, or the like) to self-sustain, that is, dynamically extend wireless network 300 to provide a desired level of service. It is noted, that the term "extended" is not intended to imply the wireless network 300-1 is different from the wireless network 300. For example, MWE 200 can be arranged to provide wireless services based in part on relaying wireless signals received via extended wireless network 300-1 through wireless network 300 and WBS 100 to provide wireless services in an area where wireless signals corresponding to wireless network 300 may be insufficient for a desired task or may be unavailable on a permanent basis.

As a specific example, MWE 200 can be arranged to move to a particular room or location within an environment (e.g., child's room, conference room, or the like) wherein permanent wireless services via wireless network 300 are unavailable. As another example, MWE 200 can be arranged to move to a particular room or location within an environment (e.g., covered porch, conference room, or the like) where wireless services via wireless network 300 are insufficient to meet current demand (e.g., too many simultaneous connections, or the like).

Figure 2A:
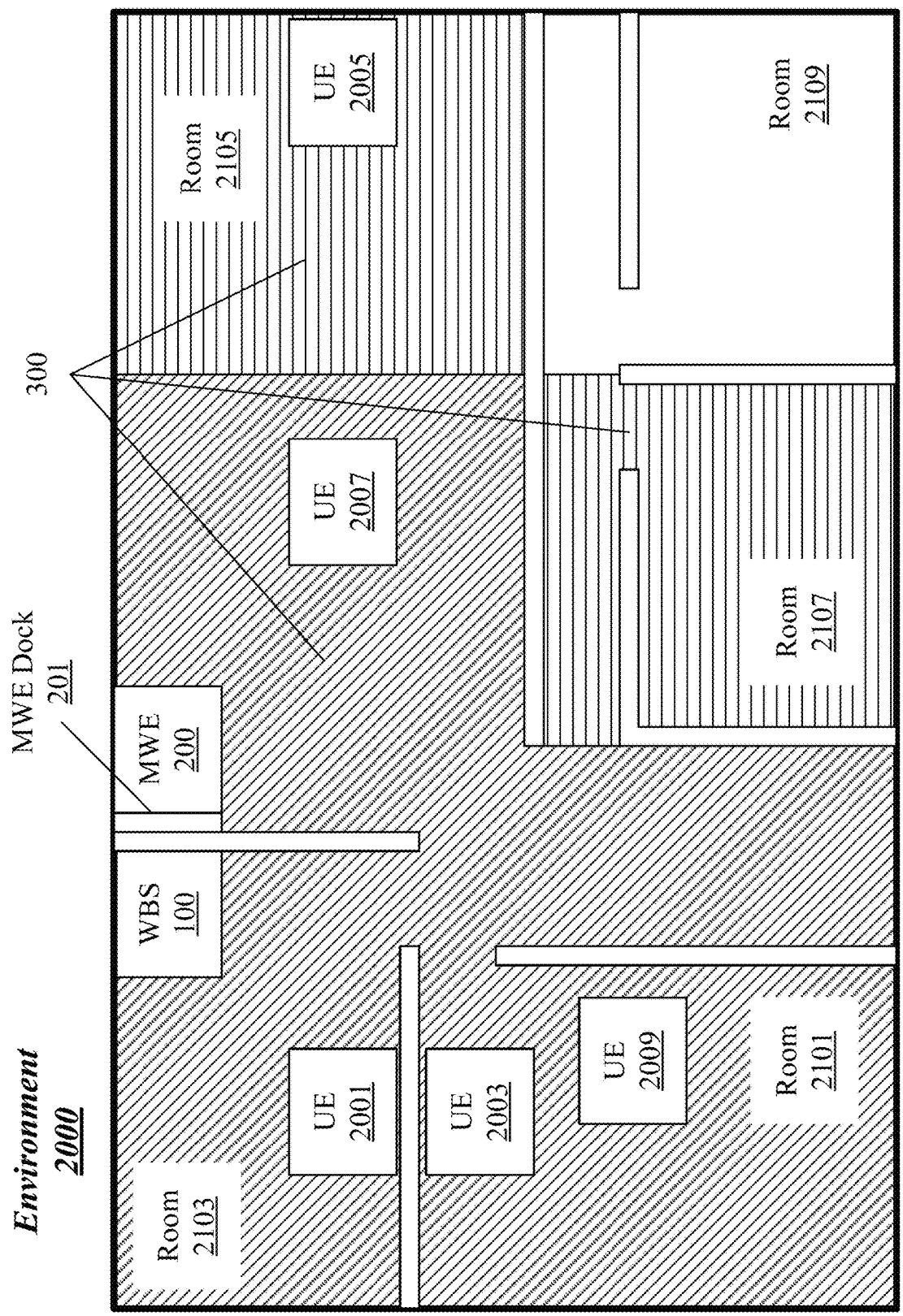
FIGS. 2A-2C illustrate an example of the first system in an example environment.
Figure 2B:
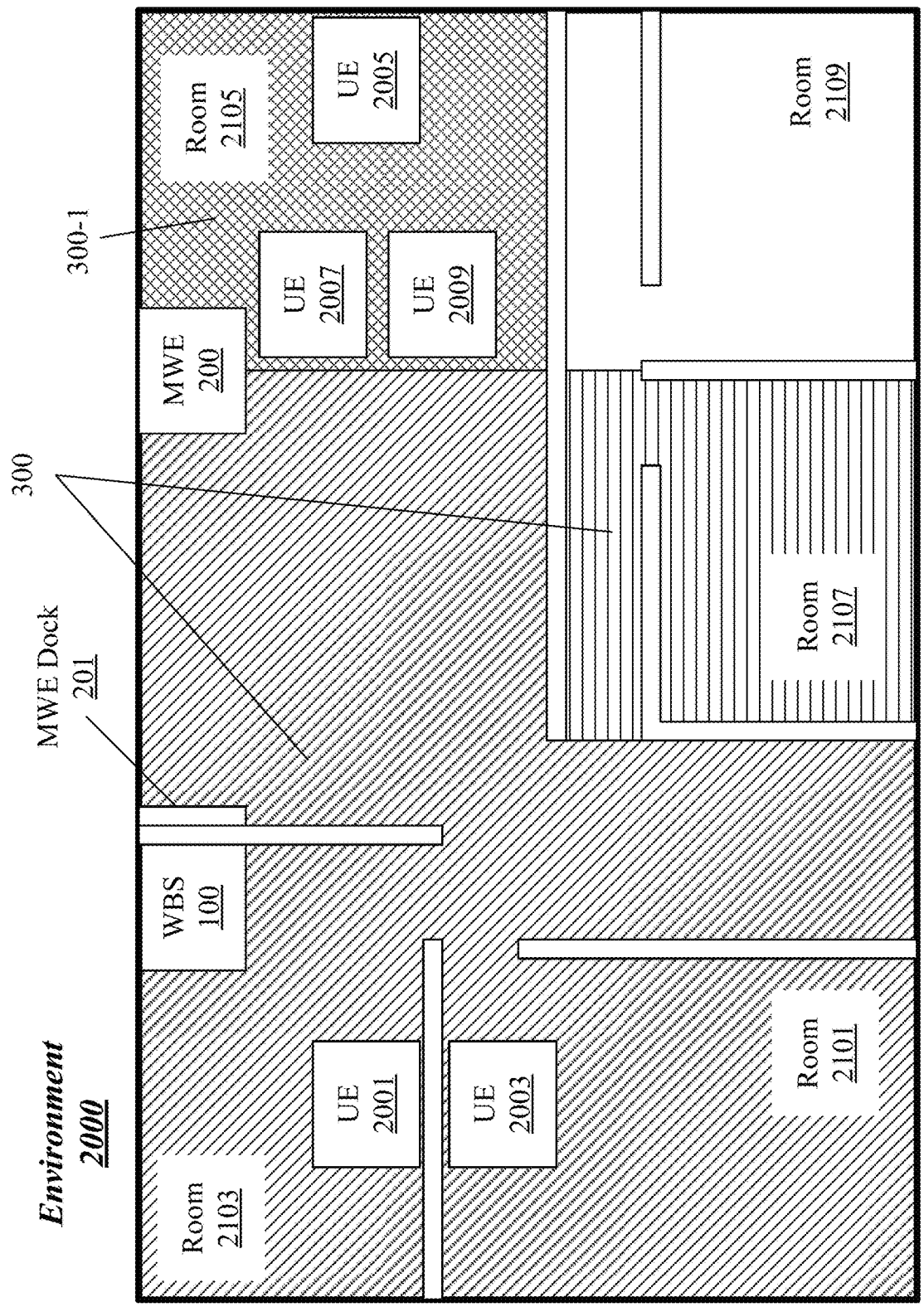
Figure 2C:
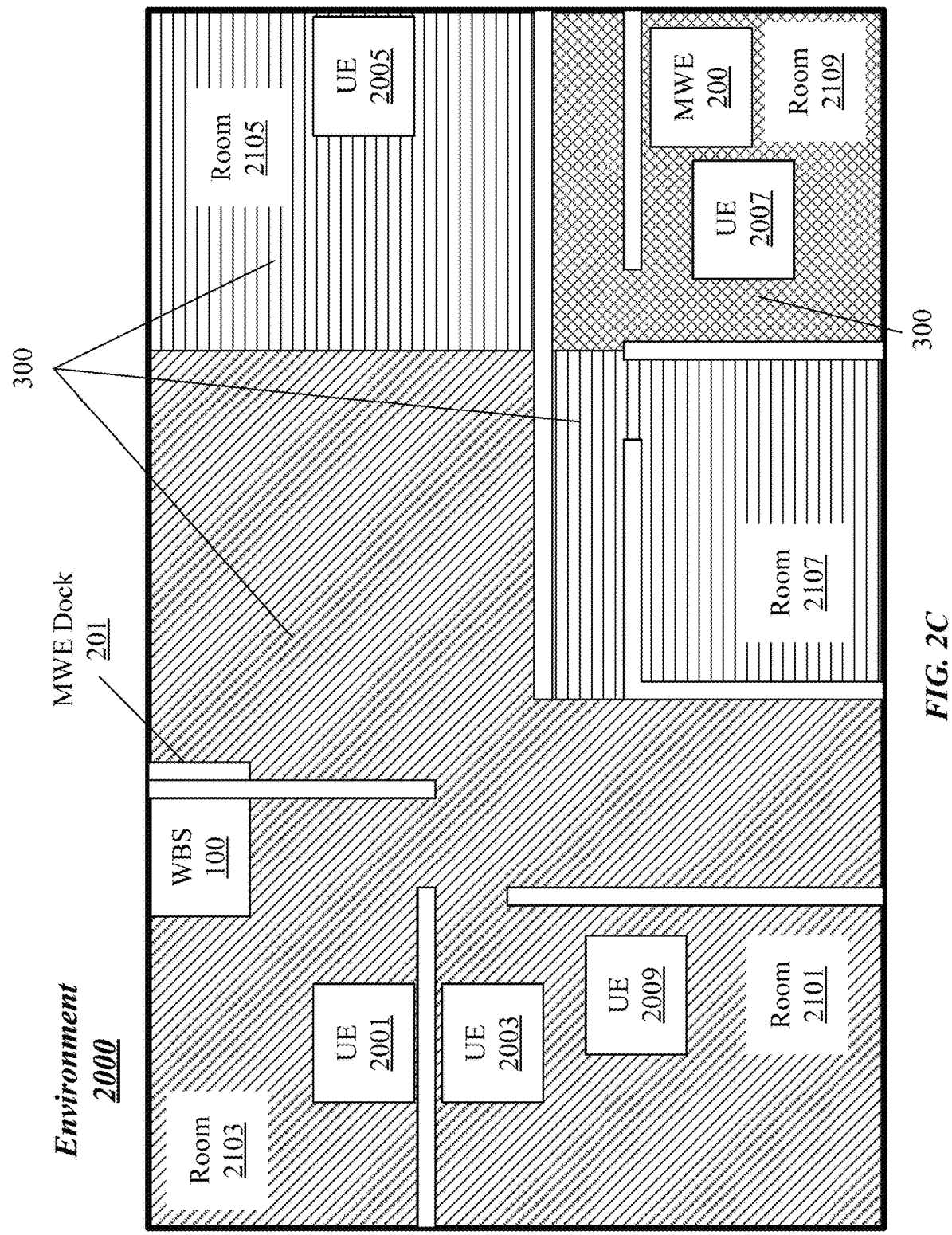
Figure 5:
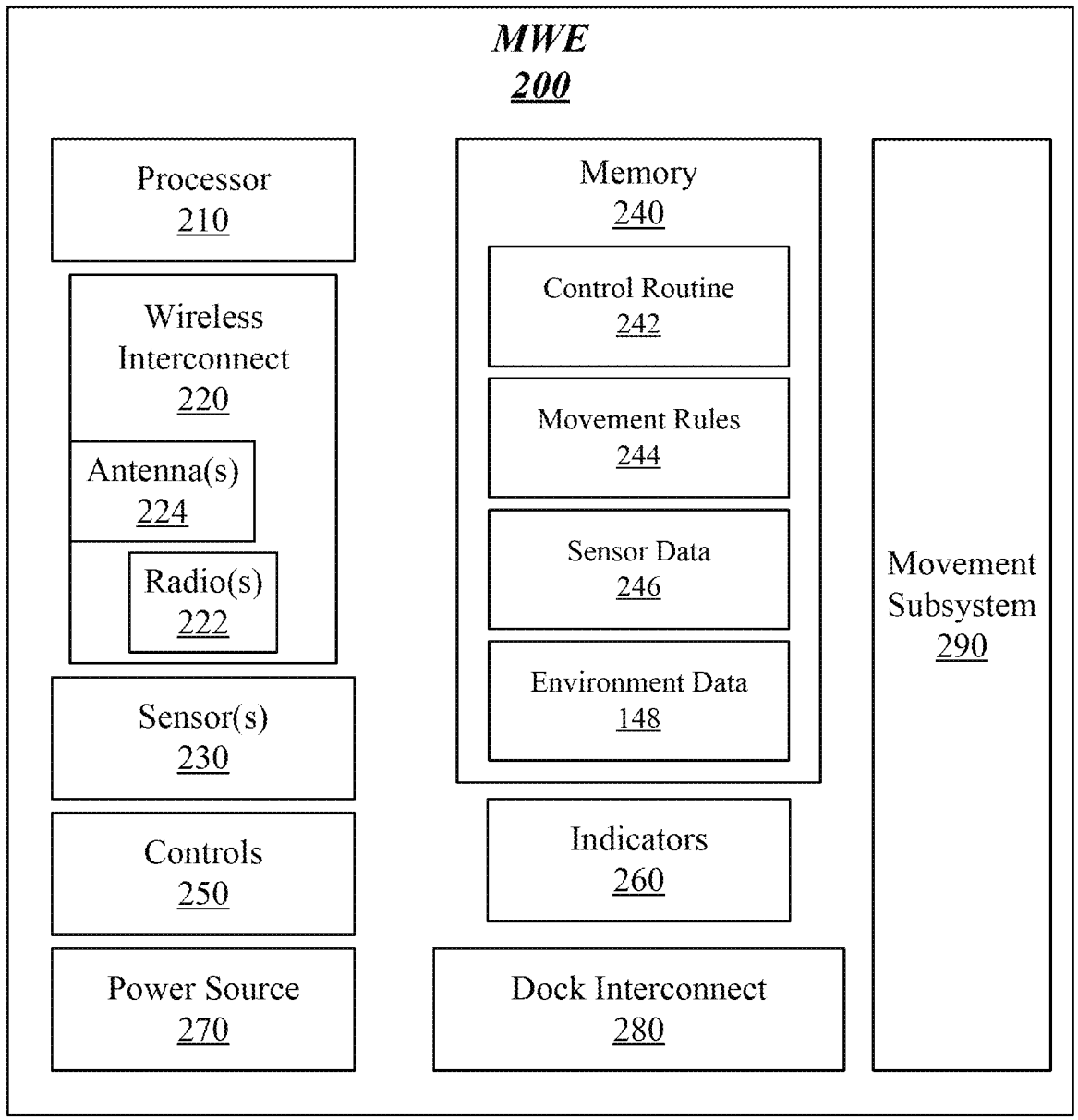
FIG. 5 illustrates an example of a second portion of the first system.
Figure 5:
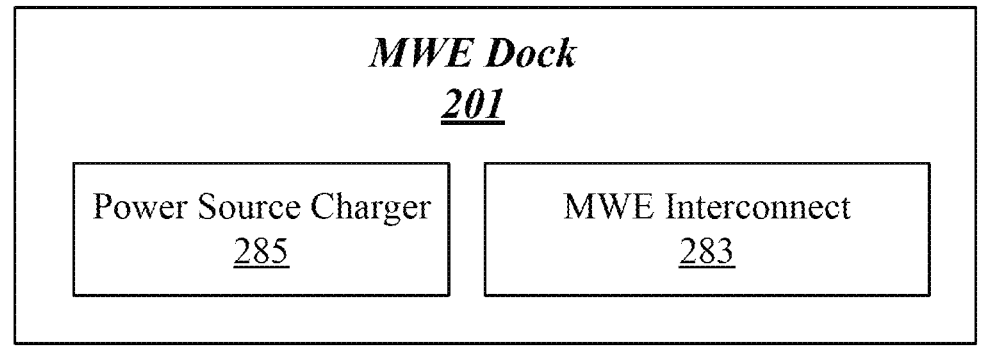

With some examples, MWE 200 can be arranged to move within an environment and return to a designated "parking" spot, such as, a dock or base station (see FIG. 5). The dock can be arranged to charge MWE 200. With some examples, MWE 200 can be deployed within an environment based on a variety of rules. The rules can specify that MWE 200 move within an environment to maintain a level of service above a threshold amount. In other examples, the rules can specify that MWE 200 move within an environment to augment wireless network based on various geo-location and/or time based restrictions. For example, MWE 200 may be restricted from augmenting wireless network within specific portions of an environment during particular times of a day. FIGS. 2A-2C depict an example environment 2000 in which system 1000 can be deployed. During operation, system 1000 can be implemented to provide wireless services within environment 2000. Particularly, WBS 100 can provide wireless services via a wireless network while MWE 200 can be deployed to various locations within environment 2000 to self-sustain, that is dynamically extend, the wireless network. Turning more particularly to FIG. 2A, environment 2000 is depicted including a number of portion or "rooms". For example rooms 2101, room 2103, room 2105, room 2107, and room 2109 are depicted. It is noted, that the environment 2000 is given for example and discussion only and not to be limiting. In practice, system 1000 can be deployed within any environment and the environment need not be like environment 2000.

During operation, WBS 100 can provide a wireless network. For example, wireless network 300 is depicted covering portions of environment 2000. For example, wireless network 300 is depicted covering rooms 2101 to 2107. Furthermore, during practice, due to various environmental conditions (e.g., WBS location, physical obstructions, obstruction material, radio interference, or the like) connectivity or "strength" of the wireless network 300 may differ in different portions of the environment. For example, wireless network 300 is depicted having a different strength is rooms 2101, 2103, and part of 2105 than in the balance of room 2105 and room 2017. Furthermore, wireless network 300 is depicted not covering room 2109. Accordingly, user equipment or user device (UE) within environment 2000 may experience differing levels of service from wireless network 300. For example, UEs 2001, 2003, 2007 and 2009 may experience a higher level of service than UE 2005 due to UE 200 being located within a location of environment 2000 which has a lower quality of service or signal strength than other locations.

In practice, some of the UEs may be mobile. That is, some UEs may move throughout environment 2000. For example, UEs may be smart phones, tablet computers, laptop computers, or the like which are readily moveable within environment 2000. Turning to FIG. 2B, UEs 2007 and 2009 are depicted having moved within environment 2000 relative to their locations depicted in FIG. 2A. For example, as shown in FIG. 2B, UEs 2005 to 2009 are depicted clustered within a corner of room 2105. Of note, UEs 2005 to 2009 are depicted in a portion of room 2105 having less wireless signal strength than other portions of environment 2000. Accordingly, the present disclosure provides that MWE 200 can be dispatched (described in greater detail below) to extend or augment wireless network 300. For example, this figure depicts MWE having moved relative to the location of MWE depicted in FIG. 2A and provide extended wireless network 300-1, which covers UEs 2005 to 2009. With some examples, WBS 100 can dispatch MWE 200 based on determining that a quality of service (QoS) for one of more UEs (e.g., UE 2005 to 2009, or the like) is below a threshold level. In other examples, WBS 100 can dispatch MWE 200 based on determining that a number of UEs are simultaneously connecting to wireless network 300 from a similar geo-location within environment 2000.

Turning to FIG. 2C, UE 2007 is depicted having moved relative to the location of UE 2007 depicted in FIG. 2A. Furthermore, MWE 200 is depicted having moved from the location depicted in FIG. 2A. In particular, as depicted in FIG. 2C, UE 2007 and MWE 200 are depicted having moved to room 2109. In some examples, WBS 100 can dispatch MWE 200 based on determining that a UE has left a service area (e.g., area covered by wireless network 300). For example, WBS 100 can determine that UE 2007 has moved from room 2107 to room 2109, thereby leaving the service area. In response, WBS 100 can dispatch MWE 200 to room 2109 to extend wireless network 300 into room 2109. With some examples, WBS 100 can dispatch MWE 200 based on determining that a quality of service (QoS) for one of more UEs (e.g., UE 2007) is below a threshold level. In other examples, WBS 100 can dispatch MWE 200 based on geo-location or time based rules. For example, WBS 100 can dispatch MWE 200 to room 2109 based on determining that such dispatching is allowed (e.g., it is within a specific range of time, or the like).

With some examples, MWE 200 can be arranged to return to MWE dock 201 based on determining that recharging a power source of MWE 200 is needed, based on receiving control signals from WBS 100 indicating that extended wireless network 300-1 is no longer needed, or the like. For example, WBS 100 can determine that wireless signals originating from an area corresponding to extended wireless network 300-1 have fallen below a threshold value and can dispatch MWE 200 to a new location and/or can send a signal including an indication for MWE 200 to return to dock 201.

Figure 3:
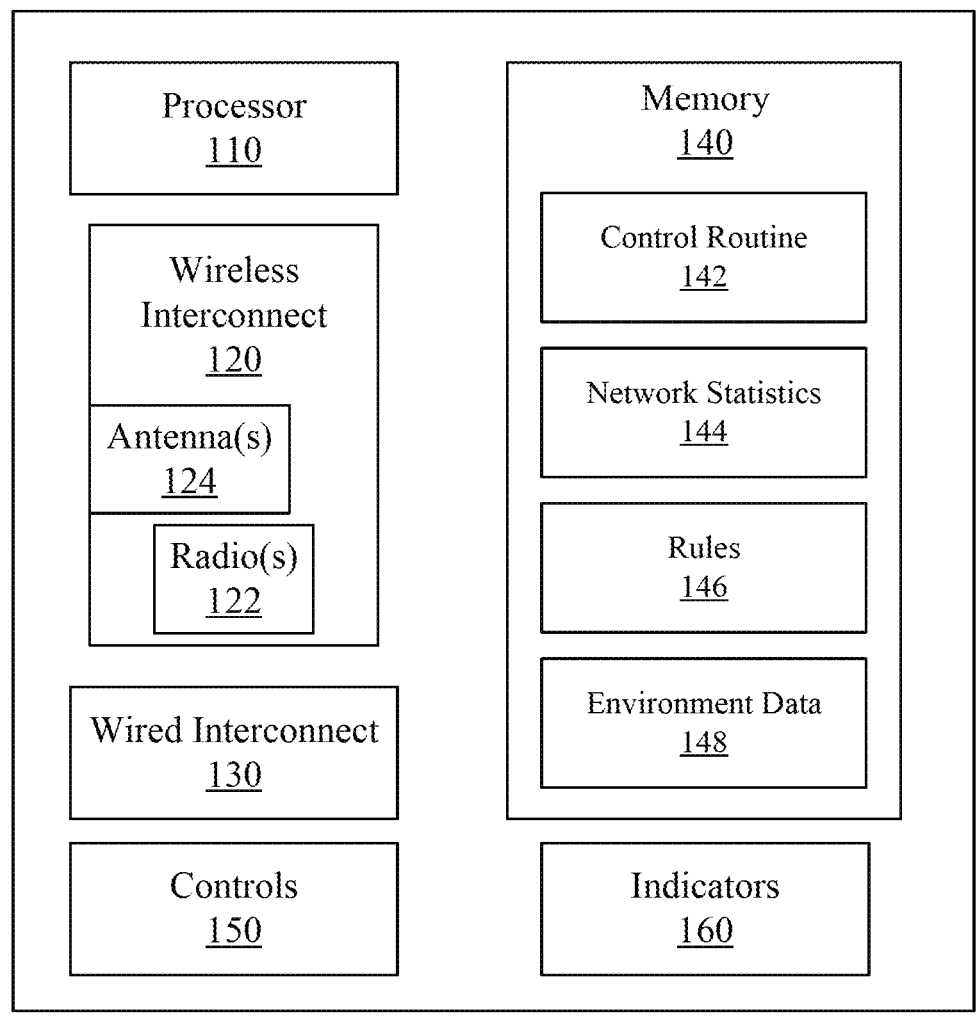
FIG. 3 illustrates an example of a first portion of the first system.
Figure 4:
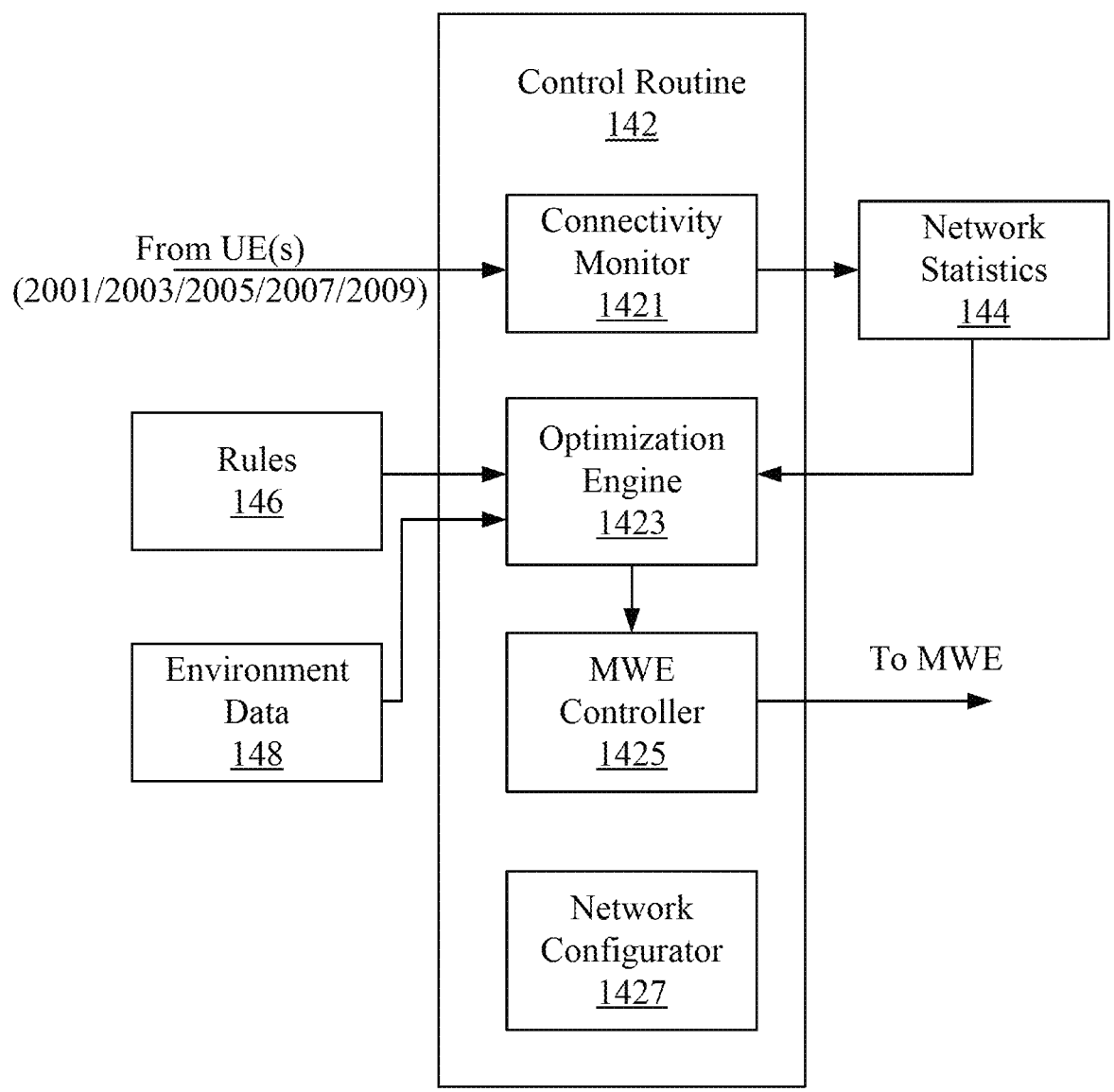
FIG. 4 illustrates an example of the first portion of the first system in greater detail.
Figure 6:
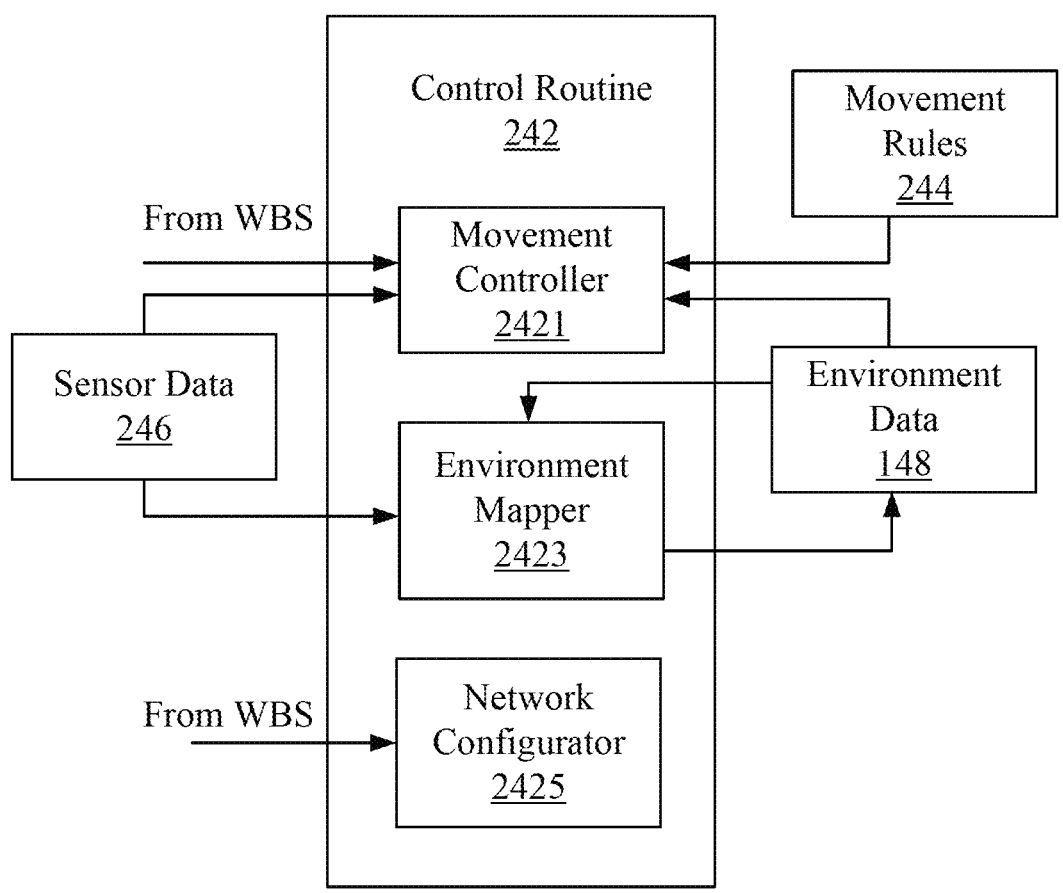
FIG. 6 illustrates an example of the second portion of the first system in greater detail.

FIGS. 3-6 depict example embodiments of the WBS 100 and the MWE 200. Specifically, FIGS. 3-4 depict an example embodiment of the WBS 100 while FIGS. 5-6 depict an example embodiment of the MWE 200. It is noted, that FIGS. 3-6 are described with reference to the system 1000 of FIG. 1 and environment 2000 of FIGS. 2A-2C. However, each of the WBS 100 and MWE 200 could be implemented in a system having an alternative configuration than that depicted in FIG. 1. For example, multiple WBS 100 and/or MWE 200 could be provided. In such an example, multiple MWEs 200 may share a dockings station. As another example, multiple MWEs 200 may have a dedicated docking station in different locations within an environment. Furthermore, the WBS 100 and MWE 200 depicted in these figures could be deployed in any of a variety of environments and reference to the environment 2000 is given for purposes of explanation only. Examples are not limited in this context.

Turning more specifically, to FIG. 3 and the WBS 100. As depicted, the WBS 100 can include a processor 110, wireless interconnect 120, wired interconnect 130, memory 140, controls 150 and indicators 160. In general, WBS 100 can be any device arranged to provide a wireless network, such as, for example, a wireless router, a combination wireless router and modem, or the like.

In various examples, processor 110 can be any of a variety of processors arranged to execute instructions. Furthermore, processor 110 can include multiple processors, a multi-threaded processor, a multi-core processor (whether the multiple cores coexist on the same or separate dies), and/or a multi-processor architecture of some other variety by which multiple physically separate processors are in some way linked. With some embodiments, processor 110 can be adapted to processor machine learning models. For example, processor 110 could be an application specific integrated circuit (ASIC) arranged to processor machine learning models. In other examples, processor 110 could be a field programable gate array (FPGA) arranged to processor machine learning models.

In general, the wireless interconnect 120 can include a number of wireless radios 122 and a number of antennas 124. Wireless interconnect 120, and particularly radio(s) 122 and antenna(s) 124 can be arranged to provide a wireless network, such as, for example wireless network 300. Said differently, radio(s) 122 and antenna(s) 124 can send and receive information elements wirelessly via radio frequencies or channels. Wireless interconnect 120 can be arranged to send and receive information elements via any number of wireless frequencies and/or channels. In some examples, wireless interconnect 120 can send and receive information elements via WiFi frequencies, such as, for example, 2.4 GHz, 5 GHz, or the like. In some examples, wireless interconnect 120 can send and receive information elements via multiple frequencies simultaneously. Furthermore, with some embodiments, wireless interconnect 120 can be arranged to provide advanced wireless signaling features, such as, for example, multiple input multiple output (MIMO) features, or the like. Wired interconnect 130 can include a wired network interconnect, arranged to couple WBS 100 to a wired network, such as, for example, an Internet connection, a wired LAN connection, or the like.

In various embodiments, memory 140 may be based on any of a wide variety of information storage technologies, possibly including volatile technologies requiring the uninterrupted provision of electric power, and possibly including technologies entailing the use of machine-readable storage media that may or may not be removable. Thus, memory 140 may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

In general, controls 150 can include any of a variety of controls, such as, for example, buttons, toggles, switches, or the like arranged to control features and/or functions of WBS 100. Furthermore, indicators 160 can include any of a variety of indicators, such as, for example, displays, light emitting diodes, or the like, arranged to indicate status and/or enabled features of WBS 100.

Memory 140 can store one or more of control routine 142, wireless network statistics 144, rules 146, and environment data 148. In general, control routine 142 incorporates a sequence of instructions operative on the components of the WBS 100 (e.g., the processor 110, or the like) to implement logic to cause MWE 200 to augment a wireless network provided by WBS 100. For example, processor 110 can execute control routine 142 to determine network statistics 144 and send a control signal to MWE 200 based on the determined network statistics 144 and wireless network extension rules 148, the control signal to cause the MWE 200 to move within an environment (e.g., environment 2000 of FIGS. 2A-2C, or the like).

With some implementations, processor 110 in executing control routine 142 can determine network statistics based on a quality of service (QoS). For example, processor 110 in executing control routine 142 can determine network statistics including a QoS score for a user device (e.g., UE 2001, UE 2003, etc.) used in an environment in which WBS 100 is deployed (e.g., environment 2000, or the like). Processor 110 in executing control routine 142 can determine a control signal to send to MWE 200 to cause MWE 200 to move within environment 2000 to provide extended wireless network 300-1 to self-sustain and/or augment wireless network 300 provided by WBS 100.

In some embodiments, processor 110 in executing control routine 142 can determine whether network statistics (e.g., QoS measurements between WBS 100 and UE 2001, or the like) dictate that wireless network 300 should be augmented. For example, processor 110 in executing control routine 142 can determine whether QoS measurements are less than a threshold QoS level specified in rules 144, or the like. In some embodiments, processor 110 in executing control routine 142 can determine a location within an environment (e.g., environment 2000, or the like) with which to dispatch MWE 200 to augment wireless network 300. For example, processor 110 in executing control routine 142 can determine a location within environment 2000 to dispatch MWE 200 based on network statistics (e.g., QoS measurements between WBS 100 and UE 2001, or the like, wireless triangulation data, or the like) and environment data 148. In some examples, environment data 148 can include information about locations within environment 2000. With some examples, environment data 148 can include indications of distances, directions, geo-coordinates, or the like. In some examples, environment data 148 can include indications of environment with respect to a docking station location of MWE 200 (e.g., docking station location 2010, or the like).

Turning more particularly to FIG. 4, with some examples control routine 142 can include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor 110. Where one or more device drivers are included, those device drivers may provide support for any of a variety of other components, whether hardware or software components, of corresponding ones of the WBS 100.

Control routine 142 may include or be otherwise linked to processor 110, wireless interconnect 120, wired interconnect 130, and memory 140. Processor 110 can be arranged to execute control routine 142 to operate the interconnects 120 and/or 130 to transmit and receive signals via the network 300 as described herein. Among the signals received and transmitted may be signals conveying information including network statistics 144, environment data 148, and control signals including indications to dispatch MWE 200 within.

Control routine 142 can include one or more of a connectivity monitor 1421, optimization engine 1423, MWE controller 1425, and network configurator 1427. During operation, connectivity monitor 1421 can receive information including indications of wireless signals and/or indications of QoS levels for wireless signals received by WBS 100 from one or more UEs. For example, connectivity monitor 1421 can receive information including indications of QoS levels from one or more of UE 2001, 2003, 2005, 2007 and/or 2009. Connectivity monitor 1421 can generate network statistics 144 based on the received information, for example, including QoS levels.

Optimization engine 1423 can generate one or more triggers or optimizations for wireless network 300 based on the network statistics and rules 146. For example, optimization engine 1423 can determine wireless network 300 should be extended based on QoS levels indicated in network statistics 144 falling below a threshold level as indicated in rules 146. Said differently, optimization engine 1423 can determine whether QoS levels, as indicated in network statistics 144 are below a threshold level indicated in rules 146. Furthermore, optimization engine 1423 can determine wireless network 300 should be extended in a particular region or area of environment based on a determination that QoS levels are below a threshold level and environment data 148. In some examples, environment data 148 can include indications of an environment (e.g., environment 2000) and specifically, indications of a coverage level of wireless network 300 within the environment. Based on the indications of the converge level and the network statistics, optimization engine 1423 can determine an area or portion of environment within which to extend network 300.

MWE controller 1425 can generate a control signal and cause the control signal to be sent to MWE 200 (e.g., via wireless interconnect 120, or the like). The control signal can include indications to dispatch MWE 200 to a particular location (e.g., geo-location, or the like) within environment 2000 and extend network 300 with extended network 300-1 within the specified location of environment 2000. For example, MWE controller 1425 can generate a control signal including an indication to dispatch MWE 200 to room 2109 to provide extended wireless network 300-1 within room 2109 (e.g., as depicted in FIG. 2C). As another example, MWE controller 1425 can generate a control signal including an indication to dispatch MWE 200 to room 2105 to provide extended wireless network 300-1 within room 2105 (e.g., as depicted in FIG. 2B). Network configurator 1427 can configure wireless network 300. For example, network configurator 1427 can set an service set identifier (SSID) name of wireless network 300, set an encryption scheme and/or password for wireless network 300, select WiFi frequency and/or channels for wireless network 300, etc.

Turning more specifically, to FIG. 5 and the MWE 200. As depicted, the MWE 200 can include a processor 210, wireless interconnect 220, one or more sensors 230, memory 240, controls 250, indicators 260, a power source 270, dock interconnect 280, and a movement subsystem 290. Furthermore, MWE 200 may include a companion MWE dock 201. MWE dock 201 can include an MWE interconnect 283 and power source charger 285. In general, MWE 200 can be any device arranged to autonomously or semi-autonomously move within an environment and augment and/or extend a wireless network, such as provide extended wireless network 300-1. For example, MWE 200 can be an autonomous appliance including wireless network extension capabilities.

In various examples, processor 210 can be any of a variety of processors arranged to execute instructions. Furthermore, processor 210 can include multiple processors, a multi-threaded processor, a multi-core processor (whether the multiple cores coexist on the same or separate dies), and/or a multi-processor architecture of some other variety by which multiple physically separate processors are in some way linked. With some embodiments, processor 210 can be adapted to processor machine learning models. For example, processor 210 could be an application specific integrated circuit (ASIC) arranged to processor machine learning models. In other examples, processor 210 could be a field programable gate array (FPGA) arranged to processor machine learning models.

In general, the wireless interconnect 220 can include a number of wireless radios 222 and a number of antennas 224. Wireless interconnect 220, and particularly radio(s) 222 and antenna(s) 224 can be arranged to extend a wireless network, such as, for example to extend wireless network 300, thus providing extended wireless network 300-1. Said differently, radio(s) 222 and antenna(s) 224 can send and receive information elements wirelessly via radio frequencies or channels. Wireless interconnect 220 can be arranged to send and receive information elements via any number of wireless frequencies and/or channels. In some examples, wireless interconnect 220 can send and receive information elements via WiFi frequencies, such as, for example, 2.4 GHz, 5 GHz, or the like. In some examples, wireless interconnect 220 can send and receive information elements via multiple frequencies simultaneously. Furthermore, with some embodiments, wireless interconnect 220 can be arranged to provide advanced wireless signaling features, such as, for example, multiple input multiple output (MIMO) features, or the like.

In general, sensor(s) 230 can be any of a variety of sensors arranged to detect environment information, such as, physical surroundings, geo-information, or the like. For example, sensor(s) 230 can include one or more of a camera, radar sensor, infrared sensors, light sensors, RFID sensors, or the like. Signals from sensor(s) 230 can be used to determine environment data and/or to navigate within an environment. For example, MWE 200 can use signals from sensor(s) 230 to navigate within environment 2000, such as, from dock 201 to a particular location (e.g., room, or the like) and back to dock 201.

In various embodiments, memory 240 may be based on any of a wide variety of information storage technologies, possibly including volatile technologies requiring the uninterrupted provision of electric power, and possibly including technologies entailing the use of machine-readable storage media that may or may not be removable. Thus, memory 240 may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

In general, controls 250 can include any of a variety of controls, such as, for example, buttons, toggles, switches, or the like arranged to control features and/or functions of MWE 200. Furthermore, indicators 260 can include any of a variety of indicators, such as, for example, displays, light emitting diodes, or the like, arranged to indicate status and/or enabled features of MWE 200.

Power source 270 can include any of a variety of power sources, such as, for example, batteries, or the like. In general, power source 270 can rechargeable, for example, by coupling with dock 201 as described below. Dock interconnect 280 can include any of variety of interconnects arranged to transfer power from MWE dock 201 to MWE 200 to recharge power source 270. Movement subsystem 290 can include any of a variety of apparatuses, means, or devices arranged to propel and/or move MWE 200 within an environment. For example, movement subsystem 290 can include wheels, rollers, tracks, propellers, rotors, or the like.

MWE interconnect 283 can include any of can include any of variety of interconnects arranged to transfer power from MWE dock 201 to MWE 200 to recharge power source 270. Furthermore, power source charger 285 can include a power supply arranged to convert and/or condition power from a dedicated power source (e.g., 120V, 240V, or the like power) to power suitable to recharge power source 270.

Memory 240 can store one or more of control routine 242, movement rules 244, sensor data 246 and environment data 148. In general, control routine 242 incorporates a sequence of instructions operative on the components of the MWE 200 (e.g., the processor 210, or the like) to implement logic to cause MWE 200 to augment a wireless network provided by WBS 100. For example, processor 210 can execute control routine 242 to receive control signals (e.g., from WBS 100, or the like) to cause MWE 200 to navigate to a location within an environment and provide extended wireless network 300-1 to extend a wireless network provided by WBS 100. For example, as depicted in FIGS. 2A-2C, or the like.

With some implementations, processor 210 in executing control routine 242 can receive a control signal from a WBS (e.g., WBS 100, or the like) including an indication to extend a wireless network provided by the WBS. For example, processor 210 in executing control routine 242 can receive a control signal from WBS 100 including an indication to extend wireless network 300.

In some embodiments, processor 210 in executing control routine 242 can cause MWE 200 navigate to a location within an environment based on the received control signal. For example, processor 210 in executing control routine 242 can cause MWE 200 to move and/or navigate to a location within environment 2000. As a specific example, processor 210 in executing control routine 242 can cause MWE 200 to navigate from MWE dock 201 to room 2109 (e.g., as depicted in FIG. 2C). As another example, processor 210 in executing control routine 242 can cause MWE 200 to navigate from MWE dock 201 to room 2105 (e.g., as depicted in FIG. 2B). Furthermore, processor 210 in executing control routine 242 can cause MWE to extend the wireless network provided by WBS. For example, processor 210 in executing control routine 242 can cause MWE 200 to provide extended wireless network 300-1 (e.g., via wireless interconnect 220, or the like) to extend wireless network 300 provided by WBS 100.

Turning more particularly to FIG. 6, with some examples control routine 242 can include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor 210. Where one or more device drivers are included, those device drivers may provide support for any of a variety of other components, whether hardware or software components, of corresponding ones of the MWE 200.

Control routine 242 may include or be otherwise linked to processor 210, wireless interconnect 220, sensor(s) 230, memory 240, and power source 270. Processor 210 can be arranged to execute control routine 242 to operate the interconnect 220 to transmit and receive signals via the network 300 and/or 300-1 as described herein. Among the signals received and transmitted may be signals conveying indications to extend a wireless network and/or navigate to a location within an environment and provide an extended wireless network.

Control routine 242 can include one or more of a movement controller 2421, an environment mapper 2423, and a network configurator 2425. During operation, movement controller 2421 can receive control signals including indications to navigate within an environment and/or provide an extended wireless network within an environment. For example, movement controller 2421 can receive control signals from WBS 100 including indications to navigate within environment 2000 and provide extended wireless network 300-1. Movement controller 2421 can send control signals to movement subsystem 290 and cause MWE 200 to navigate and/or move within environment 2000. Additionally, movement controller 2421 can send control signals to wireless interconnect 220 to cause wireless interconnect 220 to provide extended wireless network 300-1. With some examples, movement controller 2421 can cause MWE 200 to navigate within environment 2000 based on movement rules 244 and environment data 148. It is noted, that with some examples, MWE 200 can be autonomous and/or can navigate within environment 2000 without user input. For example, MWE 200 can be arranged to navigate within environment 2000 based on signals from sensor(s) 230, movement rules 244, and environment data 148.

Environment mapper 2423 can generate and/or update environment data 148. For example, environment mapper 2423 can generate and/or update environment data 148 to include indications of physical dimensions, obstructions, terrain, obstacles, or the like within environment 2000. As another example, environment mapper 2423 can be arranged to generate and/or update environment data 148 to include indications of signals strength or wireless network 300 within environment 2000. For example, environment mapper 2423 can cause MWE 200 to roam within environment 2000 to sample wireless network 300 to determine signals strength levels within portions of environment 2000 and can include indications of such signal strength levels within environment data 148. MWE 200 can communicate environment data 148 with WBS 100. Network configurator 1427 can configure wireless network 300. For example, network configurator 1427 can set an service set identifier (SSID) name of wireless network 300, set an encryption scheme and/or password for wireless network 300, select WiFi frequency and/or channels for wireless network 300, etc.

Figure 7:
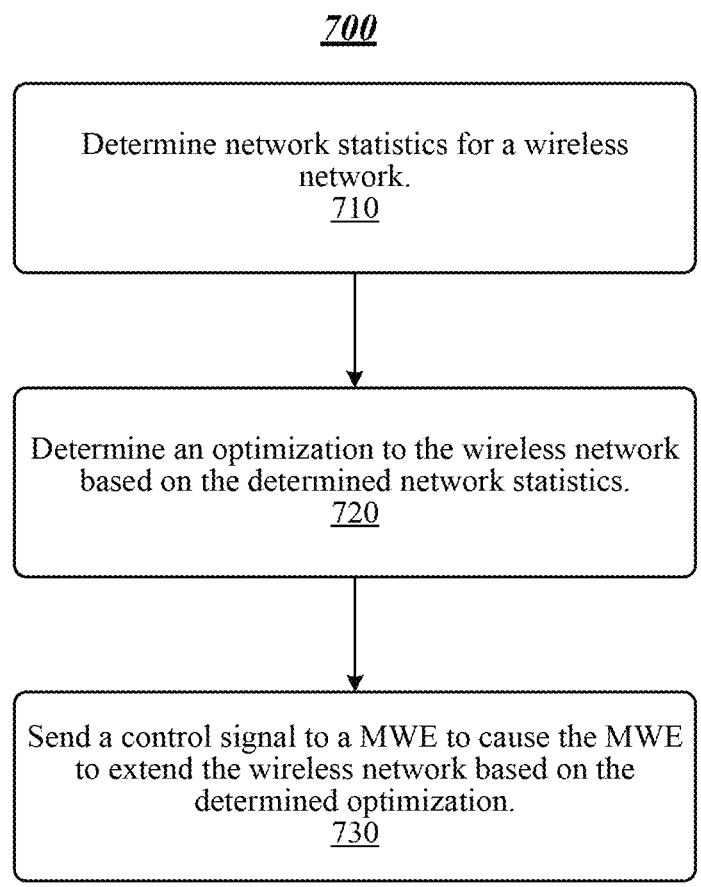
FIG. 7 illustrates a first example logic flow.

FIGS. 7-8 illustrate logic flows to dynamically adjust displayed content to reduce stress. In particular, FIG. 7 illustrates a logic flow 700 for a WBS while FIG. 8 illustrates a logic flow 800 for a MWE. It is noted, the logic flows 700 and 800 are described with reference to the system 100 depicted in FIGS. 1 and 3-6. However, this is done for purposes of illustration only and not to be limiting. Turning more specifically to FIG. 7, the logic flow 700 may begin at block 710. At block 710 "determine network statistics for a wireless network" network statistics for a wireless network are determined. For example, WBS 100 can determine statistics for network 300. In particular, processor 110, in executing control routine 142, can determine network statistics 144 (e.g., can determine QoS levels, or the like) for network 300.

Continuing to block 720 "determine an optimization to the wireless network based on the determined network statistics" an optimization to the wireless network based on the determined network statistics can be determined. For example, WBS 100 can determine an optimization to wireless network 300 based on the determined network statistics 144. In particular, processor 110, in executing control routine 142 can determine an optimization to make to wireless network 300 based on network statistics 144 and/or rules 146. For example, WBS 100 can determine to dispatch MWE 200 to a location within an environment based on network statistics 144 and rules 146 to optimize network 300, such as, for example, to extend network 300 in an area of environment 2000 where network statistics 144 indicate QoS is below a threshold level.

Continuing to block 730 "send a control signal to a MWE to cause the MWE to extend the wireless network based on the determined optimization" a control signal can be sent to an MWE to cause the MWE to extend a wireless network. For example, WBS 100 can send a control signal to MWE 200 to cause MWE 200 to extend network 300. Specifically, processor 110, in executing control routine 142, can send a control signal to MWE 200 (e.g., via network 300, or the like) to cause MWE 200 to navigate to a location within environment 2000 and extend network 300 (e.g. provide extended network 300-1, or the like).

Turning more specifically to FIG. 8, the logic flow 800 may begin at block 810. At block 810 "receive a control signal from a WBS including an indication to extend a wireless network provided by the WBS" a control signal can be received from a WBS including an indication to extend a wireless network provided by the WBS. For example, MWE 200 can receive a control signal from WBS 100 including an indication to extend network 300. Particularly, processor 210, in executing control routine 242 can receive a control signal including an indication to navigate to a location within environment 2000 and extend network 300 (e.g. provide extended network 300-1, or the like).

Continuing to block 820 "navigate to a location within an environment based on the received control signal" a MWE can navigate to a location within an environment based on the control signal received at block 810. For example, MWE 200 can navigate to a location (e.g., geo-location, room, or the like) within an environment based on the received control signal. Specifically, processor 210, in executing control routine 242 can cause movement subsystem 290 to propel or move MWE 200 to a location within an environment as indicated in control signal received at block 810.

Continuing to block 830 "provide an extended wireless network based on the received control signal" the MWE can provide an extended wireless network based on the control signal received at block 810. For example, MWE 200 can provide extended wireless network 300-1. In particular, processor 210 in executing control routine 242 can cause wireless interconnect 120 to provide extended wireless network 300-1 to extend wireless network 300 in an area of an environment 2000 in which MWE 200 has navigated to.

Figure 9:
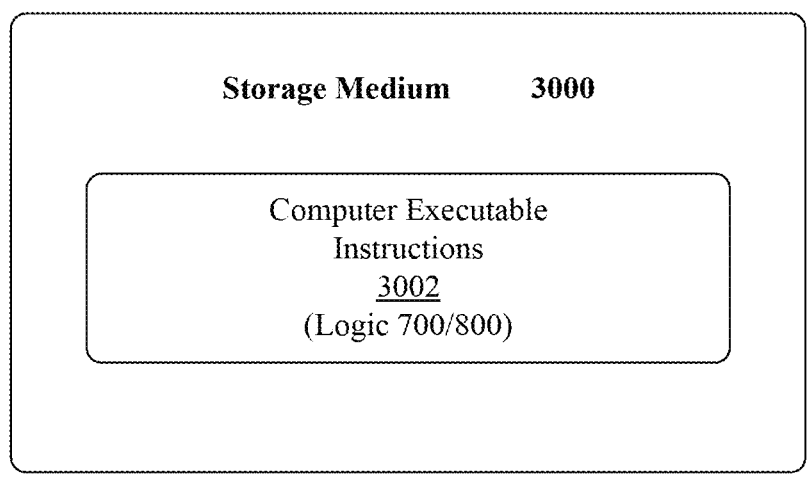
FIG. 9 illustrates an example computer readable medium.

FIG. 9 illustrates an embodiment of a storage medium 3000. The storage medium 2000 may comprise an article of manufacture. In some examples, the storage medium 3000 may include any non-transitory computer readable medium or machine readable medium, such as an optical, magnetic or semiconductor storage. The storage medium 3000 may store various types of computer executable instructions e.g., 3002). For example, the storage medium 3000 may store various types of computer executable instructions to implement logic flow 700. In some examples, the storage medium 3000 may store various types of computer executable instructions to implement logic flow 800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
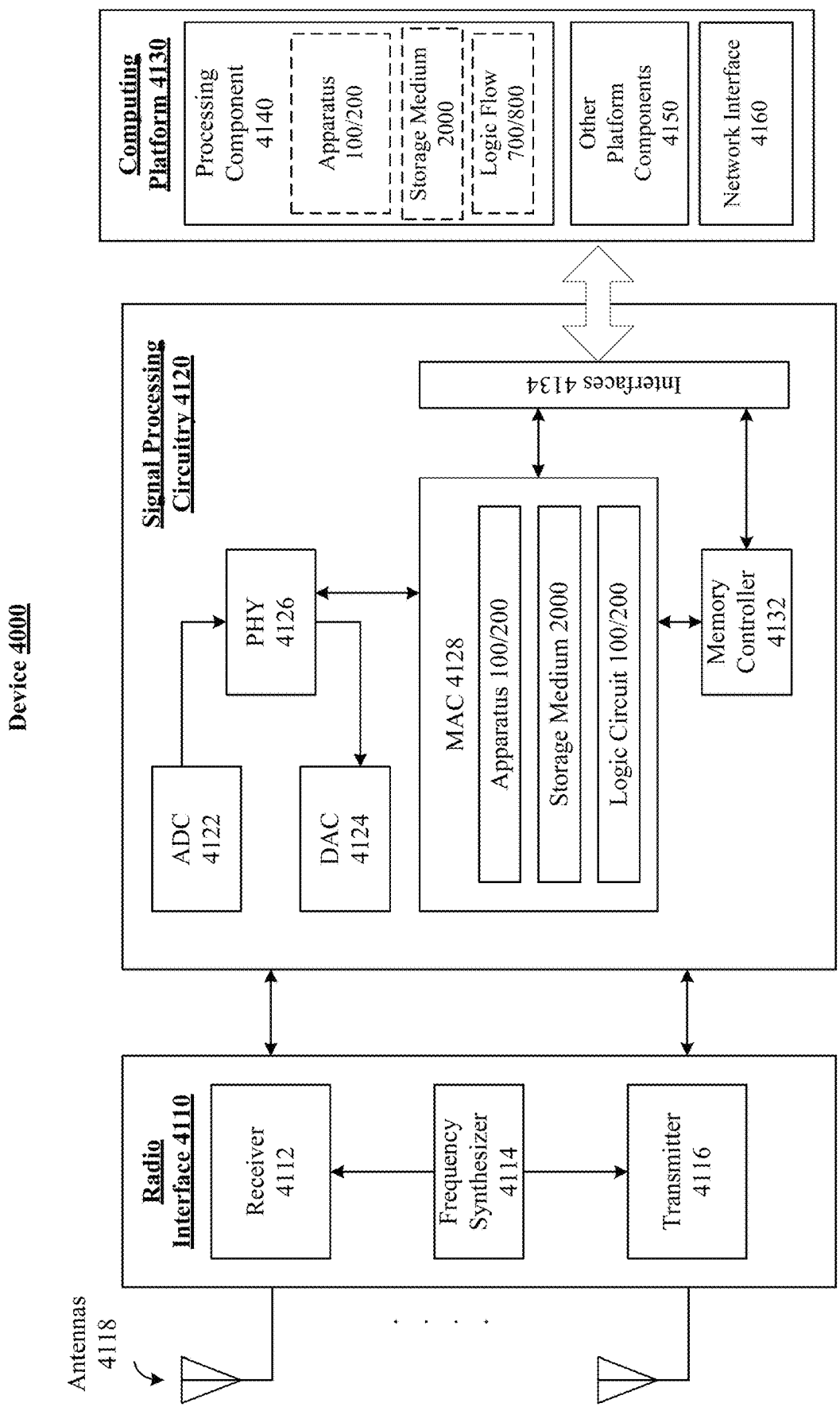
FIG. 10 illustrates one embodiment of a device.

FIG. 10 illustrates an embodiment of a device 4000. In some examples, device 4000 may be configured or arranged for wireless communications in a network such that the network 300 and/or 300-1 shown in FIG. 1. In some examples, one of the devices 100 and 200 may be implemented in the device 4000. For example, the device 4000 may implement WBS 100. In another example, the device 4000 may implement MWE 200. Additionally, the device 4000 may implement storage medium 3000 and/or a logic circuits corresponding to apparatus 100 and/or 200. The logic circuits may include physical circuits to perform operations described for the apparatuses 100 and/or 200 and/or the logic flows 700 and/or 800. As shown in this figure, device 4000 may include a radio interface 4110, baseband circuitry 4120, and computing platform 4130, although examples are not limited to this configuration.

Radio interface 4110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 4110 may include, for example, a receiver 4112, a transmitter 4116 and/or a frequency synthesizer 4114. Radio interface 4110 may include bias controls, a crystal oscillator and antennas 4118-1 to 4118-f. In another embodiment, radio interface 4110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 4120 may communicate with radio interface 4110 to process receive and/or transmit signals and may include, for example, an analog-to-digital converter 4122 for down converting received signals, a digital-to-analog converter 4124 for up converting signals for transmission. Further, baseband circuitry 4120 may include a baseband or physical layer (PHY) processing circuit 4126 for PHY link layer processing of respective receive/transmit signals. Baseband circuitry 4120 may include, for example, a processing circuit 4128 for medium access control (MAC)/data link layer processing. Baseband circuitry 4120 may include a memory controller 4132 for communicating with MAC processing circuit 4128 and/or a computing platform 4130, for example, via one or more interfaces 4134.

In some embodiments, PHY processing circuit 4126 may include a frame construction and/or detection module, in combination with additional circuitry such as a buffer memory, to construct and/or deconstruct communication frames (e.g., containing subframes). Alternatively or in addition, MAC processing circuit 4128 may share processing for certain of these functions or perform these processes independent of PHY processing circuit 4126. In some embodiments, MAC and PHY processing may be integrated into a single circuit.

Computing platform 4130 may provide computing functionality for device 4000. As shown, computing platform 4130 may include a processing component 4140. In addition to, or alternatively of, baseband circuitry 4120 of device 4000 may execute processing operations or logic for the apparatus 100a, storage medium 2000, and logic circuits 1100/1200 using the processing component 4130. Processing component 4140 (and/or PHY 4126 and/or MAC 4128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 4130 may further include other platform components 4150. Other platform components 4150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 4130 may further include a network interface 4160. In some examples, network interface 4160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 4000 may be part of a device in a P2P network and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 4000 may be implemented using any combination of discrete circuitry, application specific integrated circuits (ASICs), logic gates and/or single chip architectures. Further, the features of device 4000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 4000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
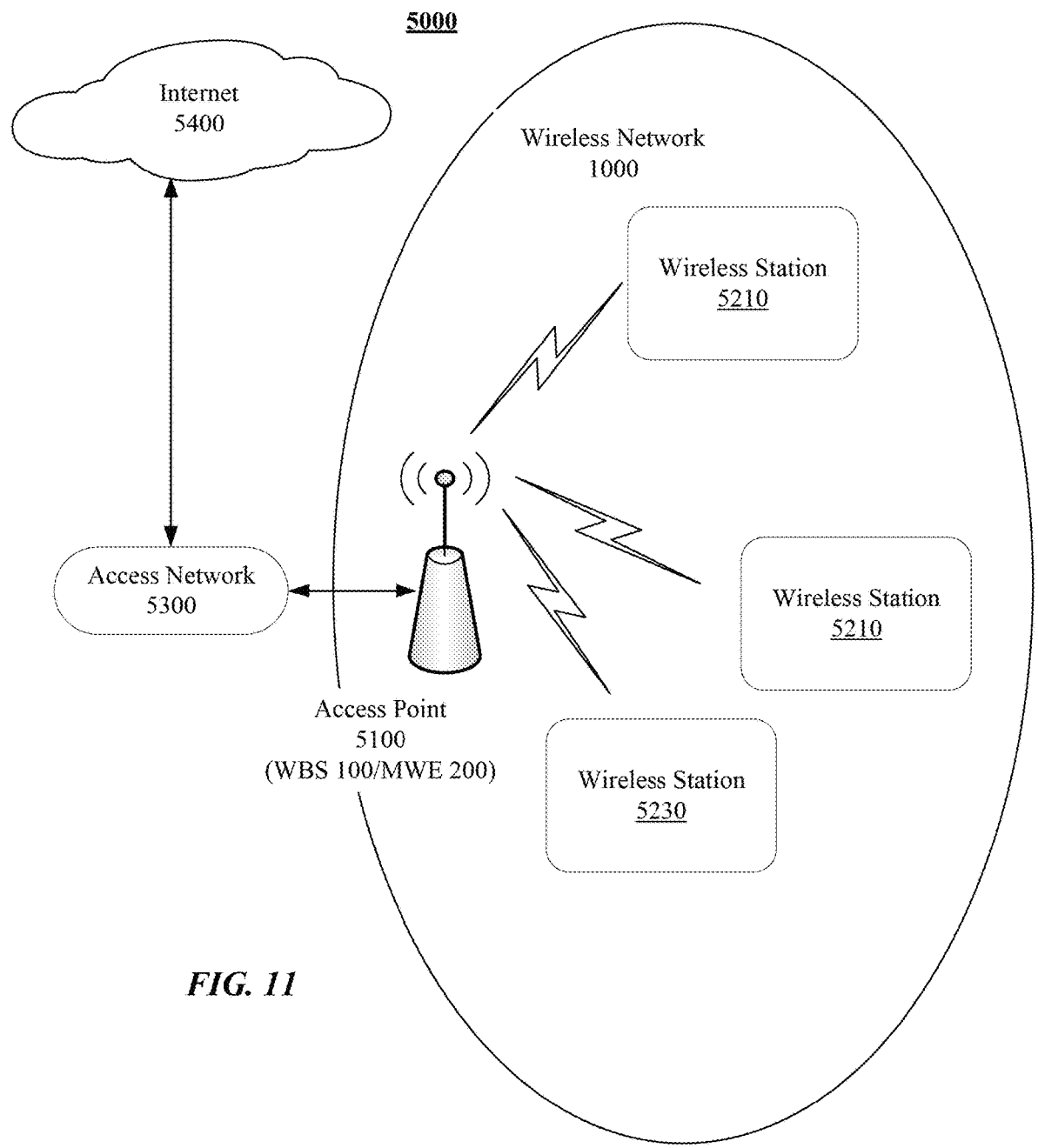
FIG. 11 illustrates one embodiment of a wireless network.

FIG. 11 illustrates an embodiment of a wireless network 5000. As shown in this figure, wireless network 5000 comprises an access point 5100 and wireless stations 5210, 5220, and 5230. In various embodiments, wireless network 5000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 5000 may comprise another type of wireless network, and/or may implement other wireless communications standards. In various embodiments, for example, wireless network 5000 may comprise a WWAN or WPAN rather than a WLAN. The embodiments are not limited to this example.

In various embodiments, wireless stations 5210, 5220, and 5230 may communicate with access point 5100 to obtain connectivity to one or more external data networks. In some embodiments, for example, wireless stations 5210, 5220, and 5230 may connect to the Internet 5400 via access point 5100 and access network 5300. In various embodiments, access network 5300 may comprise a private network that provides subscription-based Internet-connectivity, such as an Internet Service Provider (ISP) network. The embodiments are not limited to this example.

In various embodiments, wireless stations 5210, 5220, 5230 and/or access point 5100 may communicate with each other by exchanging signals within a network (e.g., wireless network 1000).

Various examples described herein may be provided to enable one or more of the wireless stations (e.g., the station 5210) to establish a TxOP where an indication of the bandwidth is provided, while still providing support for legacy devices to receive and RTS and/or CTS frame to update NAV.

Various embodiments may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1

A system comprising: a wireless base station (WBS) to provide a wireless network; and a mobile wireless extender (MWE), the MWE comprising: a movement subsystem; a wireless interconnect; and a movement controller coupled to the movement subsystem and the wireless interconnect, the movement controller to: activate the movement subsystem to navigate the MWE to a location of an environment; and activate the wireless interconnect to extend the wireless network in the location of the environment.

Example 2

The system of example 1, the movement controller to receive a control signal from the WBS, the control signal to include an indication to navigate to the location of the environment and extend the wireless network.

Example 3

The system of example 1, comprising an MWE dock, the MWE dock comprising a power source and an MWE interconnect to couple to the MWE.

Example 4

The system of example 3, the MWE comprising a rechargeable battery, the movement controller to activate the MWE to navigate the MWE adjacent to the MWE dock to couple the MWE with the MWE dock to recharge the rechargeable battery.

Example 5

The system of example 1, the movement subsystem comprising at least one of wheels, rollers, tracks, propellers, or rotors.

Example 6

The system of example 1, the WBS comprising: a wireless interconnect to provide the wireless network; a connectivity monitor to determine at least one networks statistics for the wireless network; and an optimization engine to: generate a control signal based on the at least one network statistic, the control signal to include an indication to the MWE to navigate to the location of the environment and extend the wireless network; and send the control signal to the MWE.

Example 7

The system of example 6, the at least one statistic comprising a quality of service level between the WBS and at least one user device.

Example 8

The system of example 7, the optimization engine to generate the control signal based in part on the at least one networks statistic and rules.

Example 9

The system of example 8, the rules comprising at least one threshold level of service corresponding to the at least one network statistic.

Example 10

The system of example 9, the optimization engine to generate the control signal based on a determination that the at least one statistics is below the at least one threshold level.

Example 11

An apparatus for a wireless network, comprising: a movement subsystem; a wireless interconnect; and a movement controller coupled to the movement subsystem and the wireless interconnect, the movement controller to: activate the movement subsystem to navigate the apparatus to a location of an environment; and activate the wireless interconnect to extend a wireless network provided by a wireless base station (WBS) in the location of the environment.

Example 12

The apparatus of example 11, the movement controller to receive a control signal from the WBS, the control signal to include an indication to navigate to the location of the environment and extend the wireless network.

Example 13

The apparatus of example 11, comprising a rechargeable battery, the movement controller to activate the movement subsystem to navigate the apparatus adjacent to a dock to couple the apparatus with the dock to recharge the rechargeable battery.

Example 14

The apparatus of example 11, the movement subsystem comprising at least one of wheels, rollers, tracks, propellers, or rotors.

Example 15

An apparatus for a wireless network, comprising: a wireless interconnect to provide a wireless network; a connectivity monitor to determine at least one network statistic for the wireless network; and an optimization engine to: generate a control signal based on the at least one network statistic, the control signal to include an indication to navigate to a location of an environment and extend the wireless network; and send the control signal to a mobile wireless extended (MWE) to cause the MWE to navigate to the location and extend the wireless network.

Example 16

The apparatus of example 15, the at least one statistic comprising a quality of service level between the WBS and at least one user device.

Example 17

The apparatus of example 16, the optimization engine to generate the control signal based in part on the at least one networks statistic and rules.

Example 18

The apparatus of example 17, the rules comprising at least one threshold level of service corresponding to the at least one network statistic.

Example 19

The apparatus of example 18, the optimization engine to generate the control signal based on a determination that the at least one statistics is below the at least one threshold level.

Example 20

A method comprising: activating a movement subsystem of a mobile wireless extender (MWE) to navigate the MWE to a location of an environment; and activate a wireless interconnect of the MWE to provide an extended wireless network in the location of the environment, the extended wireless network to extend a wireless network provided by a WBS.

Example 21

The method of example 20, comprising receiving, at the MWE, a control signal to include an indication to navigate to the location of the environment and extend the wireless network.

Example 22

The method of example 21, comprising receiving, at the MWE, the control signal from the WBS.

Example 23

The method of example 20, comprising: activating the movement controller to activate the MWE to navigate the MWE adjacent to an MWE dock; coupling the MWE to the MWE dock; and recharging a rechargeable battery of the MWE.

Example 24

The method of example 20, the movement subsystem comprising at least one of wheels, rollers, tracks, propellers, or rotors.

Example 25

The method of example 20, comprising: determining at least one networks statistics for the wireless network; generating a control signal based on the at least one network statistic, the control signal to include an indication to the MWE to navigate to the location of the environment and extend the wireless network; and sending the control signal to the MWE.

Example 26

The method of example 25, the at least one statistic comprising a quality of service level between the WBS and at least one user device.

Example 27

The method of example 26, comprising generating the control signal based in part on the at least one networks statistic and rules.

Example 28

The method of example 27, the rules comprising at least one threshold level of service corresponding to the at least one network statistic.

Example 29

The method of example 28, comprising generating the control signal based on a determination that the at least one statistics is below the at least one threshold level.

Example 30

An apparatus for a device, the apparatus comprising means for performing the method of any one of examples 20 to 29.

Example 31

At least one machine-readable storage medium comprising instructions that when executed by a mobile wireless extender (MWE), cause the MWE to: activate a movement subsystem of the MWE to navigate the MWE to a location of an environment; and activate a wireless interconnect of the MWE to provide an extended wireless network in the location of the environment, the extended wireless network to extend a wireless network provided by a WBS.

Example 32

The at least one machine-readable storage medium of example 31, comprising instructions that when executed by the MWE, cause the MWE to receive a control signal to include an indication to navigate to the location of the environment and extend the wireless network.

Example 33

The at least one machine-readable storage medium of example 32, the control signal received from the WBS.

Example 34

The at least one machine-readable storage medium of example 31, comprising instructions that when executed by the MWE, cause the MWE to: activate the movement controller to activate the MWE to navigate the MWE adjacent to an MWE dock; couple the MWE to the MWE dock; and recharge a rechargeable battery of the MWE.

Example 35

The at least one machine-readable storage medium of example 31, the movement subsystem comprising at least one of wheels, rollers, tracks, propellers, or rotors.

Example 36

At least one machine-readable storage medium comprising instructions that when executed by a wireless base station (WBS), cause the WBS to: provide a wireless network; determine at least one networks statistics for the wireless network; generate a control signal based on the at least one network statistic, the control signal to include an indication to a mobile wireless extender (MWE) to navigate to the location of the environment and extend the wireless network; and send the control signal to the MWE.

Example 37

The at least one machine-readable storage medium of example 36, the at least one statistic comprising a quality of service level between the WBS and at least one user device.

Example 38

The at least one machine-readable storage medium of example 36, comprising instructions that when executed by the WBS, cause the WBS to generate the control signal based in part on the at least one networks statistic and rules.

Example 39

The at least one machine-readable storage medium of example 38, the rules comprising at least one threshold level of service corresponding to the at least one network statistic.

Example 40

The at least one machine-readable storage medium of example 39, comprising instructions that when executed by the WBS, cause the WBS to generate the control signal based on a determination that the at least one statistics is below the at least one threshold level.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for a wireless network, comprising:
a movement subsystem;
a wireless interconnect;
a rechargeable battery;
a processor, coupled to the movement subsystem and the wireless interconnect; and
memory, the memory comprising instructions executable by the processor and environment data including indications of a map of an indoor environment, the indoor environment including at least a first room and a second room, the instructions when executed by the processor cause the processor to:
receive, from a wireless base station (WBS) located in the first room of the indoor environment, a first control signal including an indication to roam within the indoor environment and sample the wireless network to measure levels of signal strength of the wireless network within the indoor environment;
activate, responsive to the first control signal, the movement subsystem to roam within the indoor environment and measure levels of signal strength of the wireless network;
send, to the WBS, an information element including indications of the measured levels of signal strength;
receive, from the WBS, a second control signal including an indication to navigate to the second room of the indoor environment and extend a wireless network for the indoor environment into the second room of the indoor environment, the second control signal generated by the WBS and based on at least one network statistic of the wireless network, the second control signal received via the wireless network and the wireless interconnect, wherein the second room of the indoor environment has a measured level of signal strength below a threshold value;
activate, responsive to the second control signal, the movement subsystem to navigate, based on the map, the apparatus to the second room of the indoor environment;
activate the wireless interconnect to enlarge a coverage area of the wireless network by extending the wireless network provided by the WBS into the second room of the indoor environment; and
activate the movement subsystem to navigate the apparatus adjacent to a dock, located in the indoor environment, to couple the apparatus with the dock to recharge the rechargeable battery.

2. The apparatus of claim 1, the movement subsystem comprising at least one of wheels, rollers, tracks, propellers, or rotors.

3. The apparatus of claim 1, the at least one network statistic comprising a quality of service level between the WBS and at least one user device.

4. The apparatus of claim 3, wherein the second control signal is generated by the WBS and is based on at the least one network statistic of the wireless network and rules, the rules comprising at least one threshold level of service corresponding to the at least one network statistic.

5. A method comprising:
receiving, from a wireless base station (WBS) located in a first room of an indoor environment, a first control signal including an indication roam within the indoor environment and sample a wireless network to measure levels of signal strength of the wireless network within the indoor environment;
activating, responsive to the first control signal, a movement subsystem to roam within the indoor environment and measure levels of signal strength of the wireless network;
sending, to the WBS, an information element including indications of the measured levels of signal strength;
receiving, from the WBS, a second control signal including an indication to navigate to a second room of the indoor environment and extend a wireless network provided by the WBS for the indoor environment into the second room of the indoor environment, the second control signal received via the wireless network and a wireless interconnect of a mobile wireless extender (MWE), wherein the second room of the indoor environment has a measured level of signal strength below a threshold value;
activating, responsive to the second control signal, a movement subsystem of the MWE to navigate, based on a map of the indoor environment, the MWE to the second room of the indoor environment;
activating, responsive to the second control signal, the wireless interconnect of the MWE to enlarge a coverage area of the wireless network by extending the wireless network into the second room of the indoor environment;
sending a return control signal to the movement subsystem to cause the MWE to navigate, based on the map, the MWE adjacent to an MWE dock located in the indoor environment;
coupling the MWE to the MWE dock; and
recharging a rechargeable battery of the MWE.

6. The method of claim 5, the movement subsystem comprising at least one of wheels, rollers, tracks, propellers, or rotors.

7. The method of claim 5, comprising:
determining at least one network statistic for the wireless network;
generating the second control signal based on the at least one network statistic; and
sending the second control signal to the MWE.

8. The method of claim 7, the at least one network statistic comprising a quality of service level between the WBS and at least one user device.

9. The method of claim 7, comprising generating the second control signal based in part on the at least one network statistic and rules.

10. The method of claim 9, the rules comprising at least one threshold level of service corresponding to the at least one network statistic.

11. The method of claim 10, comprising generating the second control signal based on a determination that the at least one network statistic is below the at least one threshold level.

12. At least one machine-readable storage medium comprising instructions that when executed by circuitry of a mobile wireless extender (MWE), cause the circuitry of the MWE to:
receive, from a wireless base station (WBS) located in a first room of an indoor environment, a first control signal including an indication to roam within the indoor environment and sample a wireless network to measure levels of signal strength of the wireless network within the indoor environment;
activate, responsive to the first control signal, a movement subsystem of the MWE to cause the MWE to roam within the indoor environment and measure levels of signal strength of the wireless network;
send, to the WBS, an information element including indications of the measured levels of signal strength;
receive, from the WBS, a second control signal including an indication to navigate to a second room of the indoor environment and extend a wireless network provided by the WBS for the indoor environment into the second room of the indoor environment, the second control signal received via a wireless network provided by the WBS in the indoor environment and a wireless interconnect of the MWE, wherein the second room of the indoor environment has a measured level of signal strength below a threshold value;
activate, responsive to the second control signal, a movement subsystem of the MWE to navigate, based on a map of the indoor environment, the MWE to the second room of the indoor environment;
activate, responsive to the second control signal, the wireless interconnect of the MWE to enlarge a coverage area of the wireless network by extending the wireless network into the second room of the indoor environment;
activate the movement subsystem to cause the MWE to navigate, based on the map, the MWE adjacent to an MWE dock located in the indoor environment;
couple the MWE to the MWE dock; and
recharge a rechargeable battery of the MWE.

13. The at least one machine-readable storage medium of claim 12, the movement subsystem comprising at least one of wheels, rollers, tracks, propellers, or rotors.

14. The at least one machine-readable storage medium of claim 12, wherein the second control signal is generated by the WBS and is based on at least one network statistic of the wireless network.

15. The at least one machine-readable storage medium of claim 14, the at least one network statistic comprising a quality of service level between the WBS and at least one user device.

16. The at least one machine-readable storage medium of claim 15, wherein the second control signal is generated by the WBS and is based on at least one network statistic of the wireless network and rules, the rules comprising at least one threshold level of service corresponding to the at least one network statistic.

17. A system comprising:
a wireless base station (WBS) to provide a wireless network in an indoor environment, the WBS located in a first room of the indoor environment and comprising:
a WBS wireless interconnect to provide the wireless network;
a WBS processor; and
WBS memory, the WBS memory comprising WBS instructions executable by the WBS processor;
a mobile wireless extender (MWE) comprising:
a movement subsystem;
a MWE wireless interconnect;
an MWE processor coupled to the movement subsystem and the MWE wireless interconnect; and
MWE memory, the MWE memory comprising environment data including indications of a map of the indoor environment and MWE instructions executable by the MWE processor; and
an MWE dock, the MWE dock comprising a power source and an MWE interconnect to couple to the MWE,
wherein the WBS instructions when executed by the WBS processor cause the WBS processor to:
send, to the MWE, a first control signal including an indication to roam within the indoor environment and sample the wireless network to measure levels of signal strength of the wireless network within the indoor environment;
receive, from the MWE, an information element including indications of the measured levels of signal strength;
determine at least one network statistic for the wireless network based on the measured levels of signal strength;
generate a second control signal based on the at least one network statistic, the second control signal to include an indication to navigate to a second room of the indoor environment and extend the wireless network into the second room of the indoor environment, wherein the second room of the indoor environment has a measured level of signal strength below a threshold value; and
send, via the WBS wireless interconnect and the wireless network, the second control signal to the MWE; and wherein the MWE instructions when executed by the MWE processor cause the MWE processor to:
receive, from the WBS, the first control signal;
activate, responsive to the first control signal, the movement subsystem to roam within the indoor environment and measure levels of signal strength of the wireless network;
send, to the WBS, the information element including indications of the measured levels of signal strength;
receive, via the MWE wireless interconnect and the wireless network, the second control signal;
activate the movement subsystem to navigate the MWE to the second room of the indoor environment based on the map of the indoor environment; and
activate the MWE wireless interconnect to enlarge a coverage area of the wireless network by extending the wireless network into the second room of the indoor environment.

18. The system of claim 17, the MWE comprising a rechargeable battery, the MWE instructions, when executed by the MWE processor, cause the MWE processor to activate the MWE to navigate the MWE adjacent to the MWE dock to couple the MWE with the MWE dock to recharge the rechargeable battery.

19. The system of claim 17, the movement subsystem comprising at least one of wheels, rollers, tracks, propellers, or rotors.

20. The system of claim 17, the at least one network statistic comprising quality of service (QoS) level of one or more devices coupled to the WBS via the wireless network.

* * * * *